United States Patent [19]
Tomlin

[11] 3,784,155
[45] Jan. 8, 1974

[54] BALL AND SEAT ARRANGEMENT FOR BALL VALVE

[75] Inventor: Jerry B. Tomlin, Houston, Tex.

[73] Assignee: ACF Industries, Incorporated, New York, N.Y.

[22] Filed: Apr. 13, 1973

[21] Appl. No.: 351,125

Related U.S. Application Data

[63] Continuation-in-part of Ser. No. 228,999, Feb. 24, 1972, abandoned.

[52] U.S. Cl. .............................. 251/181, 251/315
[51] Int. Cl. ........................... F16k 5/06, F16k 5/20
[58] Field of Search ........................... 251/181, 315

[56] References Cited
UNITED STATES PATENTS

| | | | |
|---|---|---|---|
| 3,097,823 | 7/0963 | Kaisel | 251/315 X |
| 3,109,623 | 11/1963 | Bryant | 251/315 X |
| 3,173,647 | 3/1965 | Bryant | 251/315 X |
| 3,195,857 | 7/1965 | Shafer | 251/315 X |
| 3,323,537 | 6/1967 | Shafer | 251/315 X |

Primary Examiner—William R. Cline
Attorney—Eugene N. Riddle

[57] ABSTRACT

The purpose of the invention is to eliminate or minimize seat seal damage which occurs when opening a ball valve under full differential pressure. The seat seals are angularly displaced from the conventional position of 45° to the valve axis, to a position closer to the axis. The spherical seating surfaces of the ball extend equally on either side of the 45° lines. As the ball rotates to open the valve or to close the valve, the seal is first uncovered where the ball and seat form a metal to metal back-up downstream of the seal, which protects the seal against blowout or damage.

4 Claims, 9 Drawing Figures

3,784,155

BALL AND SEAT ARRANGEMENT FOR BALL VALVE

CROSS-REFERENCE TO RELATED APPLICATION

This application is a continuation-in-part of application Ser. No. 228,999 filed Feb. 24, 1972, now abandoned, and entitled "Ball and Seat Arrangement for Ball Valve."

BACKGROUND OF THE INVENTION

In a ball valve, the seat seal is normally positioned at 45° to the longitudinal valve axis, while the ball nose angles in full open and closed positions may be 42°, and therefore the seat seal coverage or lap are equal angles A and B of, say, 3°. As the valve begins to open, a gap forms between the ball and seat, and the seal is forced into the gap by the high differential pressure across the seat. Damage to the seal usually occurs during high volume blowdown conditions. Various means have been used to secure the seal against blowout but they do not prevent an erosion of the seal or extrusion through the gap between the ball and seat which damages the seat seal face. According to the invention, the troublesome and expensive seal damage referred to above is prevented by a simple rearrangement of the seat seals and modification of the ball.

SUMMARY OF THE INVENTION

In ball valves according to the invention, the ball has a pair of opposed spherical surfaces about the axial flow passage through the ball and a separate pair of opposed spherical surfaces arranged at 90° to the first pair of spherical surfaces. The second separate pair of opposed spherical surfaces engages the annular seats in the closed position of the ball and the first named pair of opposed surfaces engages the annular seats in the open position of the ball. The seat seal is displaced from its normal position of 45° to the longitudinal axis, as measured from the center of the ball, toward said axis, and the ball itself is undercut or grooved adjacent both pairs of spherical surfaces so that the spherical surfaces thereof which engage the seals effectively extend equal distances on both sides of the 45° lines, when the ball is in the fully open or closed positions. With this arrangement of the seat seals and spherical surfaces, the seat seal is uncovered first on the protected side, where the seat and adjacent spherical surface form a metal to metal back-up for the seat seal, which prevents blowout or damage of the seal during opening of the valve.

DESCRIPTION OF THE PREFERRED EMBODIMENTS

Figure 1:
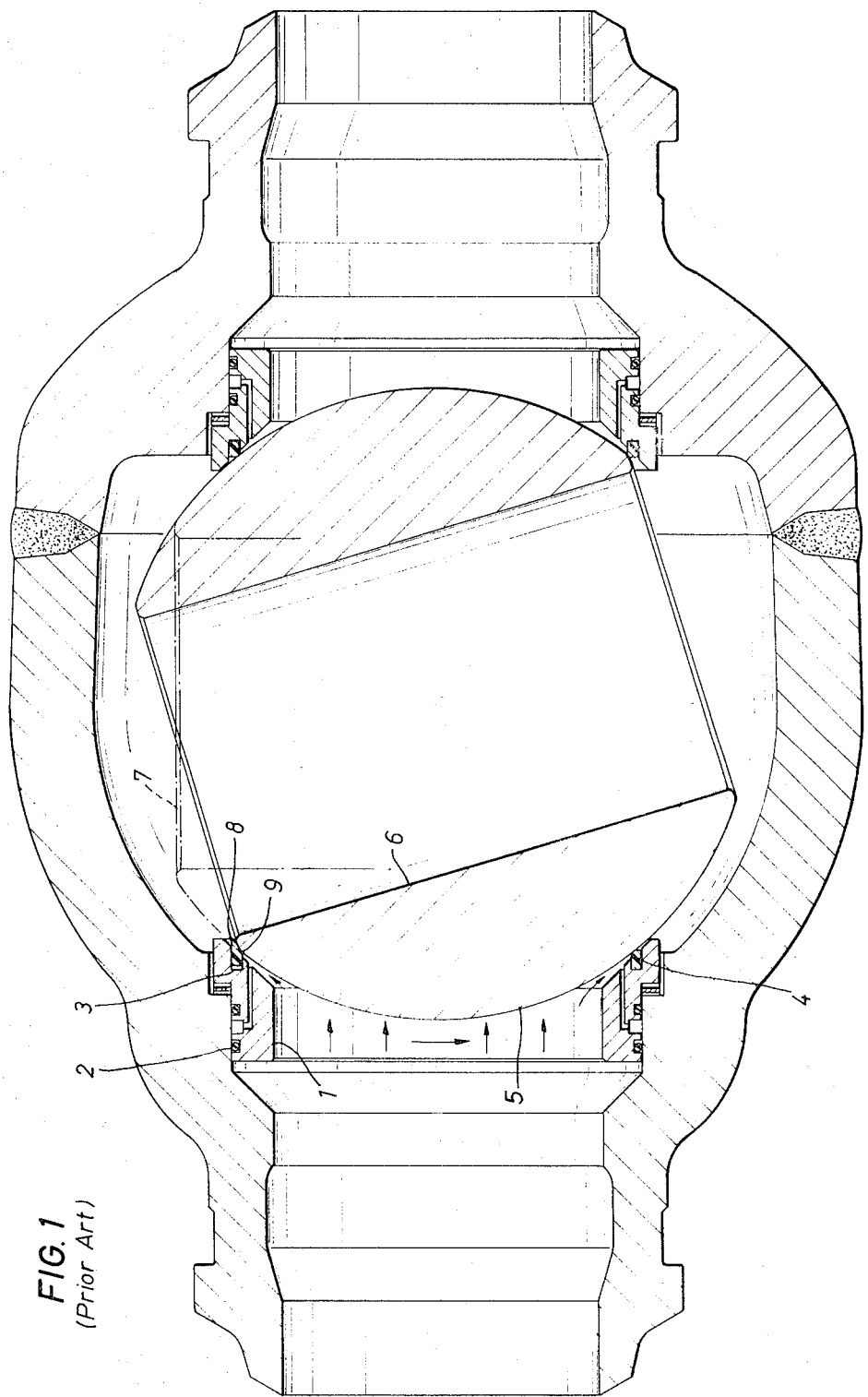
FIG. 1 is a section of a portion of a prior art valve ball and seat when the valve just begins to open.
Figure 2:
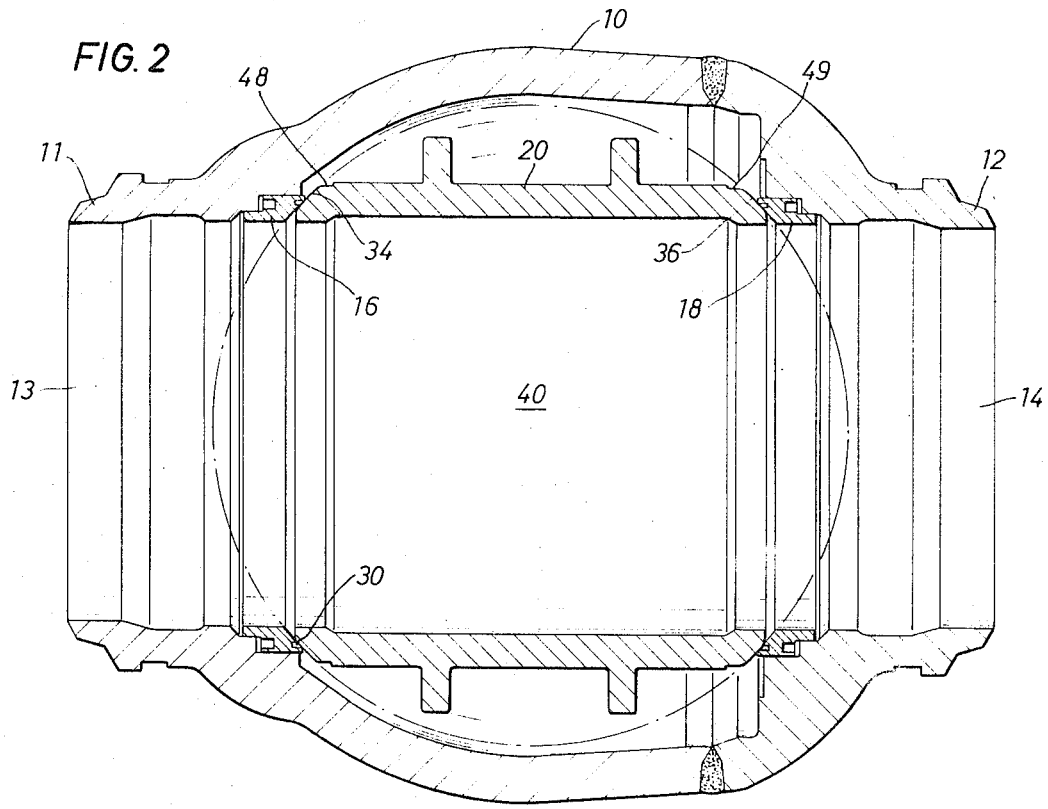
FIG. 2 is a horizontal section of a valve according to the invention.

The problem solved by the present invention may be explained with reference to FIG. 1, which shows a portion of a ball valve of conventional design. Seat 1 is assumed to be on the upstream or high pressure side of the valve. The seat is provided with one or more O-rings 2 for suitable mounting in a body (not shown). Seat 1 has an annular groove 3 in which a flexible seal ring 4 is mounted. Rotatable valve ball 5, shown in half section, has a flow passage 6. As ball 5 is rotated from the closed position, indicated by dashed lines 7, and begins to uncover seat seal 4, a gap 8 is formed between nose portion 9 of the ball and the upper portion of seat 1, as indicated in the upper left portion of FIG. 1. Assuming initial zero pressure in the body cavity of the valve and full working pressure at the upstream side, a high differential pressure is applied to the seal along the ever increasing gap 8 being formed behind the seal as the valve begins to open. This permits a portion of seal 4 to be forced or extruded into the gap, as indicated in FIG. 1, and channels the flow across the face of the seal and thus permits erosion and extrusion of that portion of the seat seal. In conventional valve design, an attempt is made to install the seal in the seat so as to prevent blowout or extrusion, but this does not eliminate an erosion of seal 5 that damages the seal surface.

Figure 3:
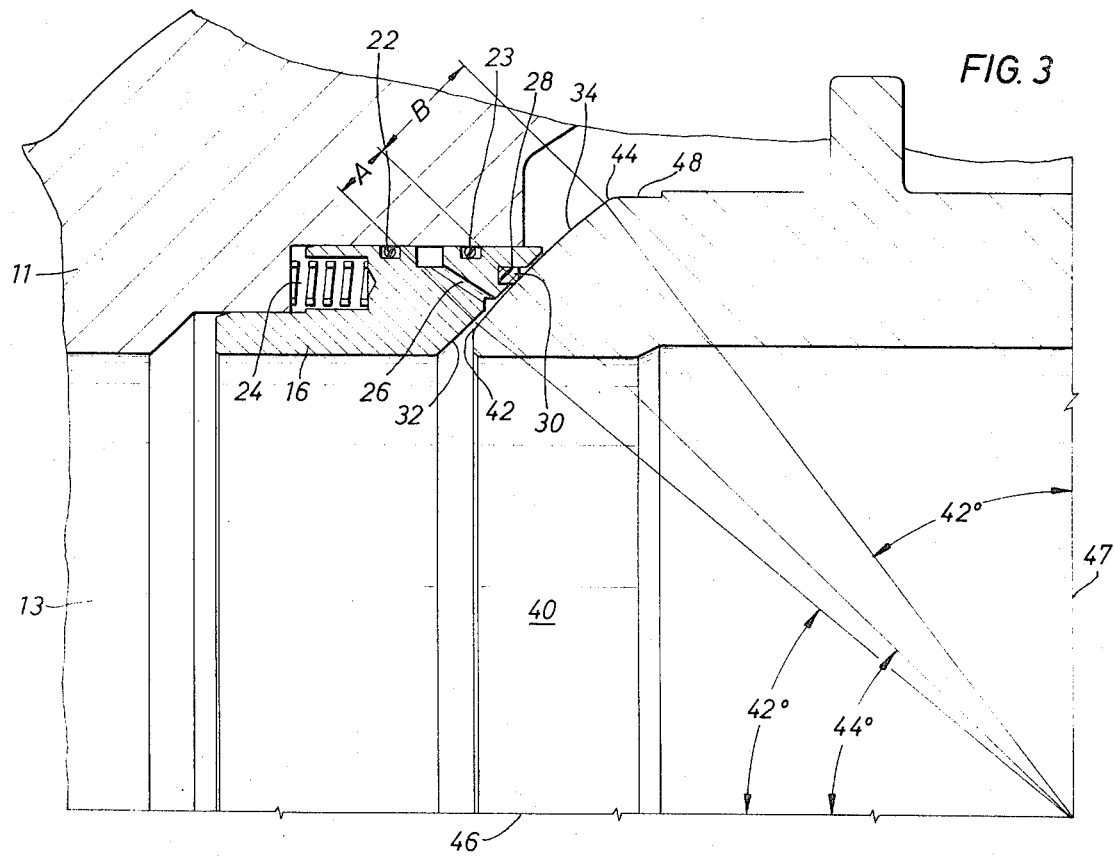
FIG. 3 is an enlarged section of a portion of the valve.

FIGS. 2 to 8 show the portions of a ball or spherical plug valve embodying the invention. A valve body 10 has cylindrical ends 11, 12 providing inlet and outlet passages 13, 14. Within the body are movable seats 16 and 18 and rotatable ball or plug 20. The seats are provided with suitable O-rings 22, 23 and springs 24 urging seats 16, 18 inwardly. Lubricating means including passages 26 are also generally provided. Each seat has an annular groove 28 in which a ring seat seal 30 of flexible resilient material is mounted. The seats have seating surfaces 32 closely fitting spherical surfaces 34, 36 of spherical plug or valve ball 20. Valve ball 20 has a flow passage 40 coextensive with inlet and outlet passages 13, 14 and opposed spherical surfaces 34, 36 extend about flow passage 40. Spherical surfaces 34 and 36 are of limited width and terminate in circular nose portions 42, 44. As indicated in FIG. 3, nose portions 42 and 44 are symmetrically disposed, being, for example, 42° from longitudinal axis 46 and transverse axis 47. The effective angle of seat seal 30, which is conventionally 45°, is here made less than 45°, for example 44°. Thus angle A between seal 30 and nose portion 42 is less than angle B between the seal and nose portion 44. It is noted that the extent of spherical surface 34 of the ball is limited by truncating or undercutting the closed sides of ball 20 as indicated at 48 and 49.

Figure 4:
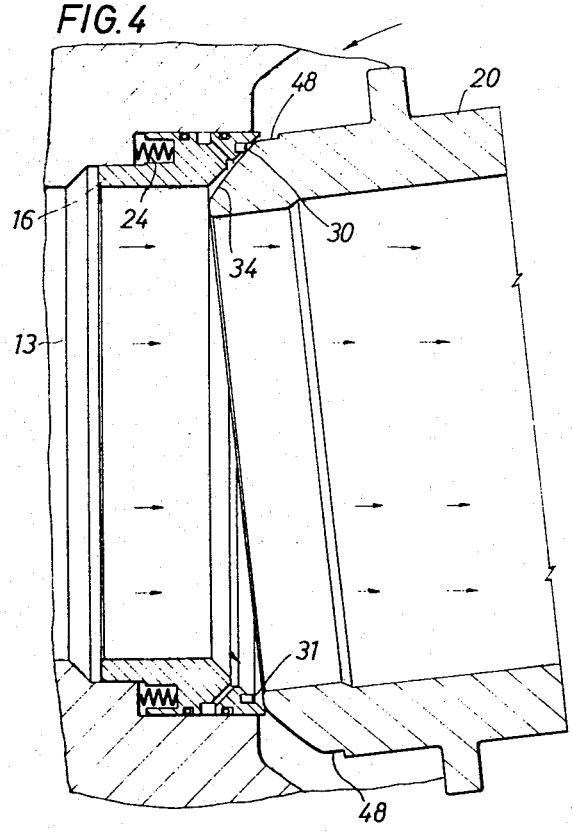
FIGS. 4, 5 and 6 are similar to FIG. 3 showing different positions of the valve ball.
Figure 5:
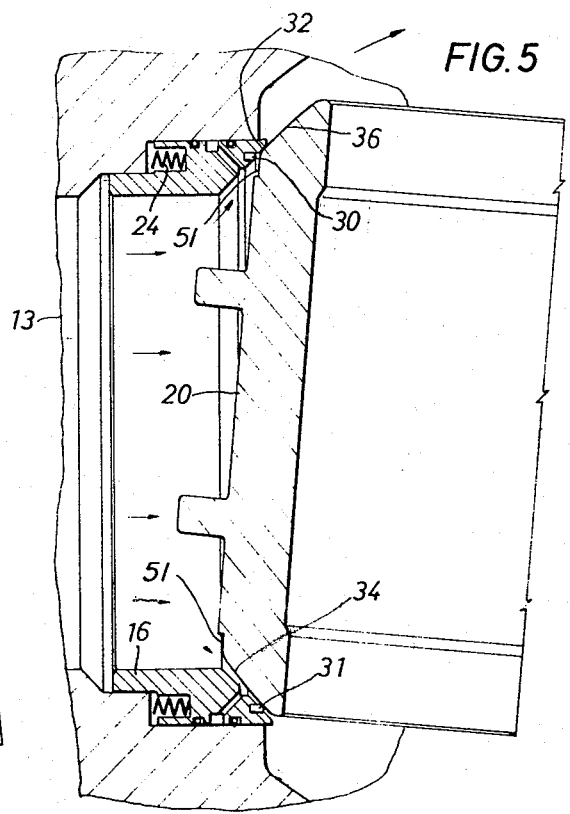
Figure 6:
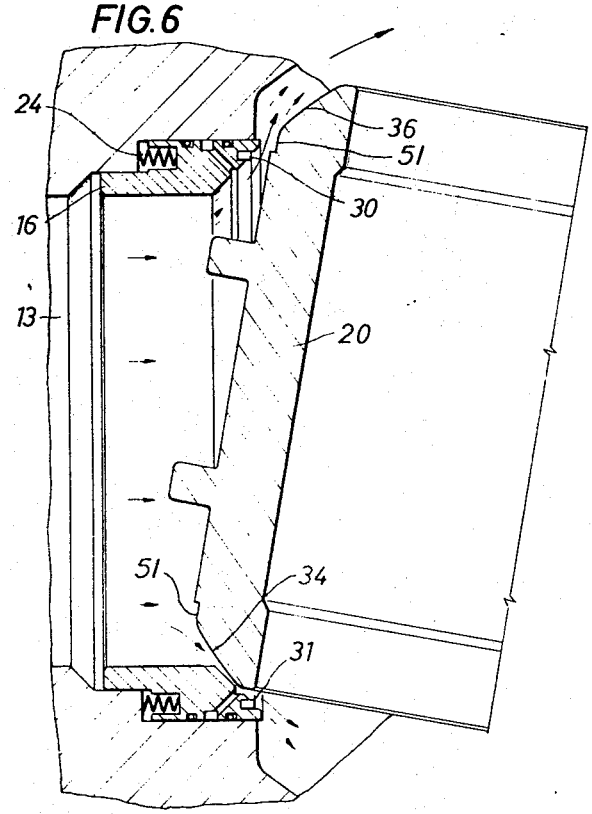

Reference is now made particularly to FIGS. 4 to 6. As ball 20 is rotated counterclockwise from its fully open position, it first uncovers the lower portion 31 of seal 30, but surfaces 32 and 34 of the seat and ball make metal to metal contact immediately behind or downstream of portion 31 of the seal and thus form a back-up for the seal which prevents blowout thereof. Pressure behind the seal and in the valve body then builds up and the differential pressure applied to the seal is thus reduced. Thus, the seal is not subjected to damaging conditions during movement from open position to closed position particularly as shown in FIG. 4.

Referring particularly to FIG. 5 in which ball 20 moves from a fully closed position toward open position, the upper portion of seal 30 is uncovered. As seal 30 is being uncovered, however, spherical surfaces 32 and 34 remain in contact immediately behind seal 30, and thus prevent blowout of the seal. After the upper portion of the seal is passed, fluid flows round the seal and into body 10. As a result, the differential pressure across the seal is reduced to a safe value before the lower portion 31 of seal 30 is uncovered, as shown in FIG. 6. This mode of operation results from the fact that the seal is broken first on the protected side of the valve after rotation through angle A from the fully closed position, while the seal on the unprotected side 31 is broken only after rotation through the larger angle B.

Figure 7:
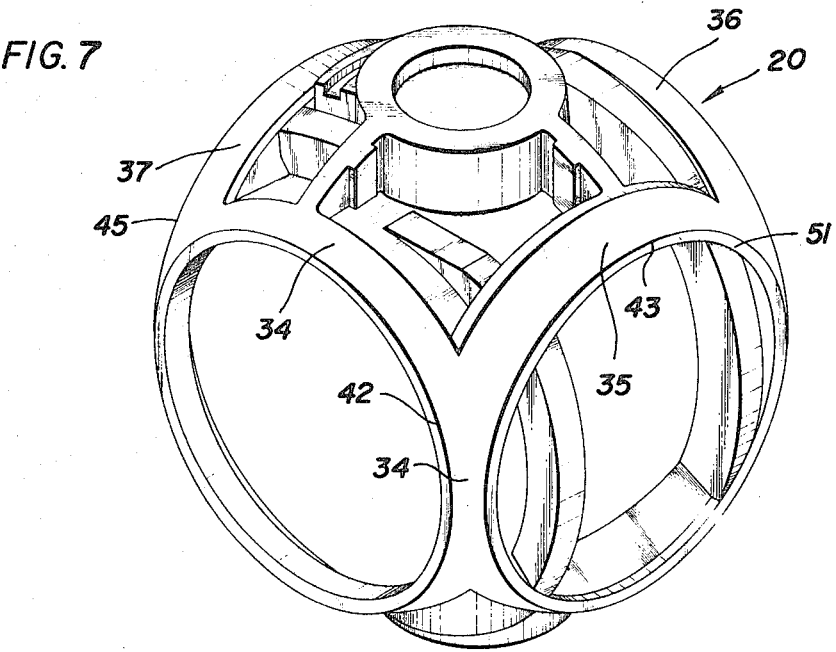
FIG. 7 is a perspective of the valve ball according to the present invention.
Figure 8:
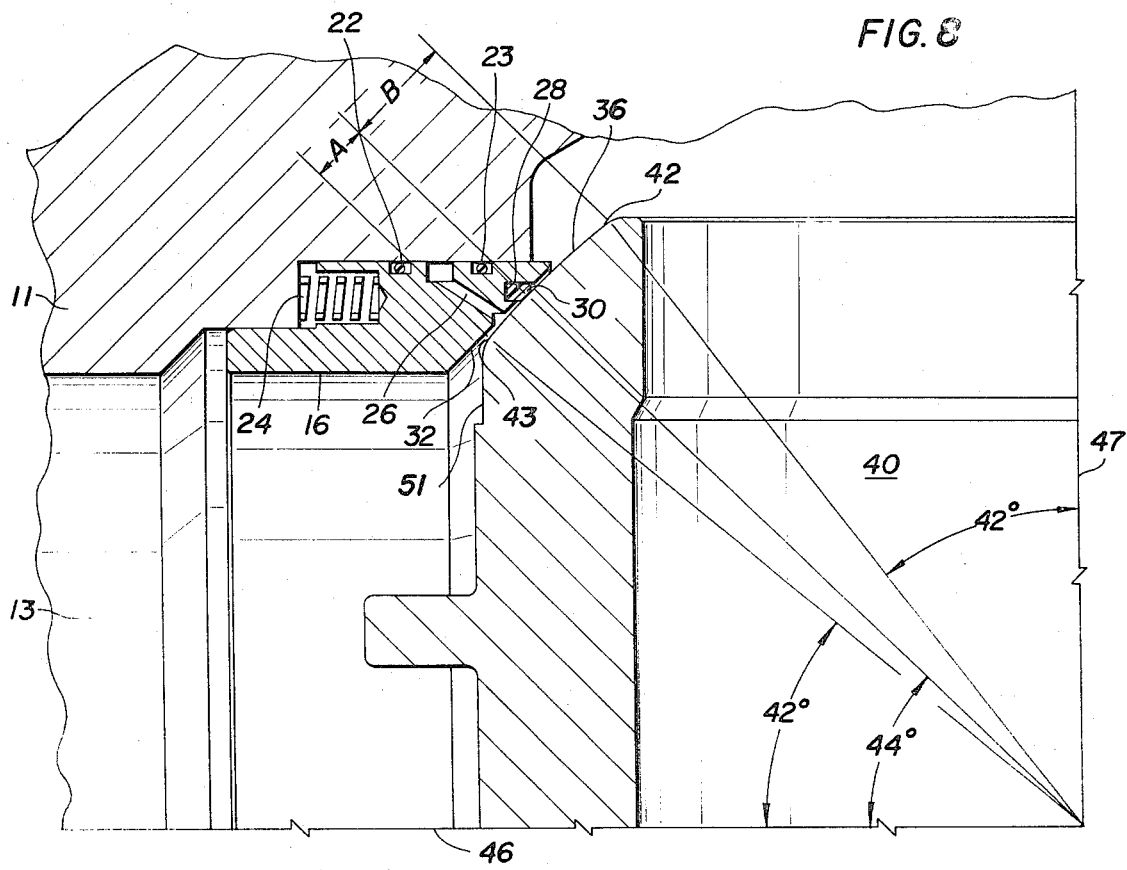
FIG. 8 is an enlarged section similar to FIG. 3 but showing the valve ball in the closed position.

Reffering particularly to FIGS. 7 and 8, valve ball 20 is shown having a pair of separate opposed spherical annular surfaces 35, 37 positioned at right angles to spherical surfaces 34, 36. Spherical surfaces 35, 37 terminate in circular nose portions 43, 45 and are symmetrically disposed at the same angularity with respect to longitudinal axis 46 and transverse axis 47 as spherical annular surfaces 34, 36. The extent of spherical surfaces 35, 37 is limited by truncating or undercutting at 51 about spherical annular surfaces 35, 37. The undercutting at 51 permits fluid pressure past annular surface 37 when nose portion 45 clears the associated seal.

Figure 9:
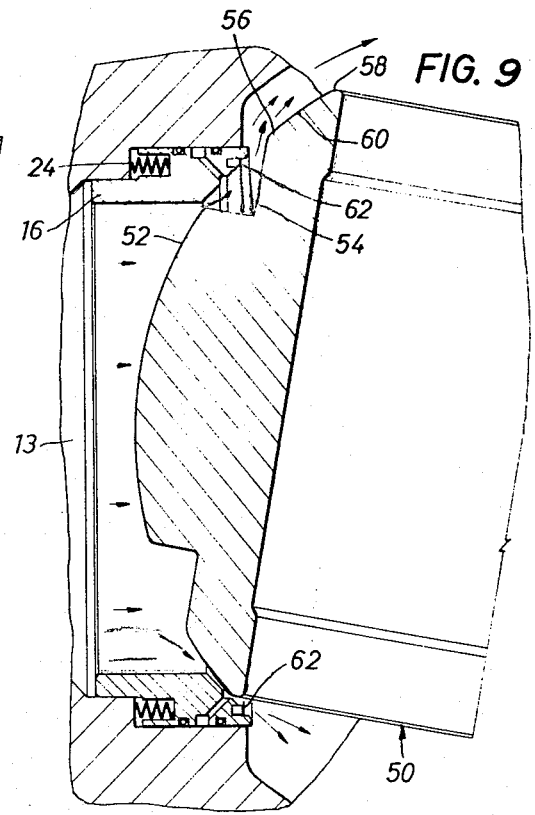
FIG. 9 is a partial section showing a different valve ball.

In FIG. 9 modified ball 50 has its closed surfaces 52 grooved or undercut at 54 to define nose portions 56, 58 at the boundaries of spherical surface portion 60. The relationship of seat seal 62 to nose portions 56 and 58 is the same as that shown in FIG. 3. The operation of the valve of FIG. 9 is obviously the same as that of the preceding figures. Thus FIG. 9 indicates how a standard ball having continuously spherical closed surfaces may be modified to conform with the principles of the invention.

It is understood that while only an upstream portion of the valve is shown in FIG. 2 to 9, that, in the preferred embodiments, the construction of the downstream side is similar, and the relationships at each point of the seal on the upstream side are duplicated at the diametrically opposite point of the downstream seal.

What is claimed is:

1. A spherical plug valve comprising a body having coaxial cylindrical inlet and outlet passages, a rotatable generally spherical plug having an axial flow passage adapted to be aligned with the inlet and outlet passages, said body having opposed upstream and downstream annular seats about the inlet and outlet passage and adapted to engage the spherical plug, said plug having a pair of opposed annular surfaces of spherical contour extending about the flow passage and adapted to engage said seats in the fully open position of the spherical plug, a separate pair of opposed annular surfaces of spherical contour on the plug positioned at right angles to said first mentioned pair of opposed annular surfaces and adapted to engage said seats in the fully closed position of the spherical plug, each seat having a ring seal thereon for engaging the annular surface, said annular spherical surfaces each having an innermost peripheral nose portion and an outermost peripheral nose portion, the innermost nose portion in the seated position of the plug at fully open and fully closed positions being closer to the ring seal than the outermost nose portion whereby the plug first uncovers a portion of the upstream seal upon movement of the plug from fully open and fully closed positions.

2. A spherical plug valve as set forth in claim 1 wherein said seats are annular members axially slidable in said body, and spring means are mounted between the body and seats for urging the seats into engagement with said plug.

3. A spherical plug valve comprising a body having coaxial cylindrical inlet and outlet passages, a rotatable generally spherical plug having an axial flow passage adapted to be aligned with the inlet and outlet passages, said body having opposed upstream and downstream annular seats about the inlet and outlet passages and adapted to engage the spherical plug, said plug having a pair of opposed annular surfaces of spherical contour extending about the flow passage and adapted to engage said seats in the fully open position of the spherical plug, a separate pair of opposed annular surfaces of spherical contour on the plug positioned on the closed sides of the plug at right angles to said first mentioned pair of opposed annular surfaces and adapted to engage said seats in the fully closed position of the spherical plug, each seat having a ring seal thereon for engaging the annular surface, said annular spherical surfaces each having an innermost peripheral nose portion and an outermost peripheral nose portion, the innermost nose portion in the seated position of the plug at fully open and fully closed position being closer to the ring seal than the outermost nose portion, said plug being truncated on the closed sides of the plug and defining the innermost peripheral nose portions on said separate pair of opposed annular surfaces whereby the plug upon movement from the fully closed position toward open position first uncovers a portion of the upstream seal and fluid pressure is communicated past the associated nose portion.

4. A spherical plug valve as set forth in claim 3 wherein the outermost nose portions at the annular surfaces about the flow passage are defined by annular grooves.

* * * * *